Patented Aug. 4, 1953

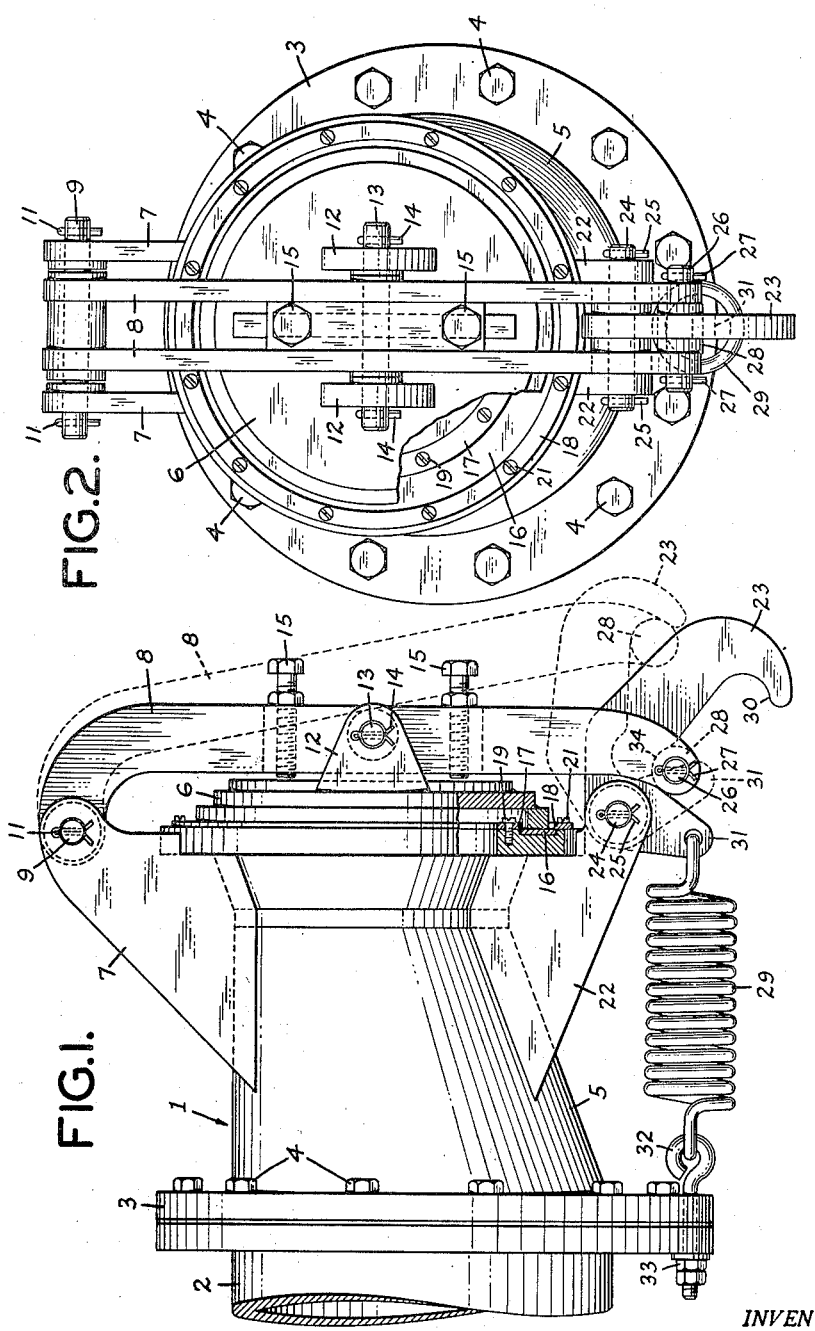
Aug. 4, 1953     B. A. FREEMAN     2,647,534
PRESSURE RELIEF VALVE APPLICABLE TO FUEL GAS MAINS
Filed Oct. 12, 1949
INVENTOR.
BENJAMIN A. FREEMAN
BY
ATTORNEY.

2,647,534

UNITED STATES PATENT OFFICE 2,647,534

PRESSURE RELIEF VALVE APPLICABLE TO FUEL GAS MAINS

Benjamin A. Freeman, Upper Montclair, N. J., assignor to Allied Chemical & Dye Corporation, New York, N. Y., a corporation of New York Application October 12, 1949, Serial No. 120,887

4 Claims. (Cl. 137—527)

This invention relates to pressure relief valves and more particularly refers to a new and improved automatic explosion head especially adapted for use on a by-product coke oven fuel gas main.

Standard practice in coke oven plants is to use a thin lead or steel sheet held between two flanges on end of gas main as a safety measure in the event the internal pressure in the main reaches unsafe limits due to an explosion or other causes. Rupture of this plate permits large quantities of gas to escape while a control valve is being closed and then requires manual manipulation to replace the rupture plate with a new plate. While such rupture plates have the virtue of simplicity, they are not self-closing upon relief of excess pressure and have a fixed breaking point dependent on the plate thickness. Many other relief devices including spring controlled pressure valves have been suggested but none have found appreciable favor in commercial use on by-product coke oven gas mains and have not superseded the simple rupture plate despite its inherent shortcomings.

The fluid pressure in by-product coke oven gas mains is ordinarily maintained at a fairly constant low pressure approximately 1 p. s. i. pressure. Frequently abnormal conditions arise, due to causes other than an explosion, temporarily increasing the pressure a few pounds. A pressure relief valve should desirably remain closed during these minor fluctuations in pressure otherwise large quantities of gas are lost by venting to the atmosphere. Also, unless the relief device closes automatically greater quantities of gas will be lost since the pressure in the gas main will drop below its normal pressure due to a time lag occurring in manually resetting the valve.

Automatic pressure release valves of the prior art which have the advantage of being self-closing are deficient in other respects. They are usually limited to opening and closing at a single predetermined pressure well above the operating pressure of the gas main. Thus, closing of the valve occurs before pressure conditions in the main are normal requiring the attention of the operators to adjust the gas pressure by other means. Gas explosions will sometimes recur unless the explosive mixture in the gas main is exhausted immediately after the initial explosion. Obviously, automatic valves closing at a high pressure effect incomplete release of the explosive mixture. Rapid pressure release is of great importance and can be accomplished only by the valve remaining wide open during essentially the entire venting period. Conventional spring held closures have a tendency to restrict the opening except at exceedingly high pressures. Furthermore, present automatic relief valves are generally intricate in design and complicated in operation so as to be impracticel in commercial use.

From the foregoing it will be evident that pressure relief valves as presently known are inadequate to cope with all conditions occurring in pressure conduits particularly those containing gaseous fluids which are susceptible to explosion.

An object of the present invention is to provide a pressure relief valve which will automatically open at a predetermined pressure and remain open until the pressure is materially reduced whereupon it will automatically close.

Another object of the present invention is to provide a safety valve which is simple in construction and operation and economical to make.

Other objects and advantages of the present invention will be apparent from the following description and accompanying drawing.

Generally speaking, the present invention contemplates a dual pressure relief mechanism which may be adjusted to open at a designated relatively high pressure and thereafter remains open until the pressure drops to a predetermined lower value whereupon the valve automatically locks itself in closed position necessitating a high pressure to again open the valve. Broadly, my valve involves a closure against which pressure is constantly exerted for urging the closure in closed position in cooperation with an added impedance or resistance for retaining the closure in closed position which impedance is overcome by the initial opening movement of the closure.

A specific embodiment of the explosion head in accordance with the present invention involves a novel combination and arrangement of elements including a body of the head having one end adapted to be secured to an opening in a container maintained under pressure, a cover closing the other open end of the head, a hinge bracket fastened to the top of the head, a pair of spaced lever arms attached to the outer surface of the cover with the upper ends of the lever arms mounted on the hinge bracket and the other ends of the lever arms extending below the cover, a bar joining the bottom ends of the levers, a roller rotatably mounted on the bar, a second bracket fastened to the bottom of the head, a cam in the shape of a pawl pivotally mounted intermediate its ends on the second bracket with the inner surface of the cam engaging the roller, a recess or shoulder on the pawl in which the roller rests when the cover is in normal closed position, a tension spring attached to one end of the pawl thereby exerting pressure against the roller and retaining the cover in closed position, and the other end of the pawl acting as a stop for the roller to limit the extent to which the cover may open.

In the accompanying drawing forming a part of this specification and showing, for purposes of exemplification, a preferred embodiment of the invention but without limiting the claimed invention to this embodiment:

Figure 1 is a partly sectioned side elevational view of the explosion head showing the cover in closed position in solid lines and in open position in broken lines;

Figure 2 is a front elevational view of the pressure release device with a portion of the cover cut away.

In the drawing, Figure 1, the explosion head designated generally by the numeral 1 is shown flanged to a by-product coke oven fuel gas main 2 by means of flange 3 secured by bolts 4. The body 5 of explosion head 1 consists of a hollow vessel having one end in open communication with gas main 2 at its flanged end 3 and the other open end normally sealed by cover 6. Two rigid metal plates 7 welded to the top of head 5 and extending upwardly therefrom comprises a hinge bracket for supporting cover 6. A pair of spaced lever arms 8 joined at one end are rotatably mounted on the hinge bracket 7 by means of bar 9 passing transversely through aligned holes in bracket 7 and the ends of lever arms 8. Cotter pins 11 passing through each end of bar 9 prevent sliding of the bars out of the holes. Welded to the top of cover 6 and extending outwardly therefrom are a pair of parallel spaced extension arms 12 with aligned holes in each for the accommodation of a bar passing therethrough. Lever arms 8 intermediate its ends are constructed of one continuous piece of metal through which a hole is bored also in alignment with the holes in extension arms 12 and the lever arms 8 are secured to cover 6 by means of bar 13 passing through the aligned holes and held in place by cotter pins 14. Two bolts 15 in the nature of set screws pass through the solid metal portion between lever arms 8 for the purpose of adjusting the amount of play between cover 6 and lever arms 8. To insure a gas tight joint between cover 6 and head 5, a gasket 16, preferably made of neoprene, is placed on face of head 5 and held in position by retaining rings 17 and 18 which in turn are secured by screws 19 and 21, respectively. Welded to and extending from the bottom of head 5 opposite hinge bracket 7 is a second pair of spaced rigid members 22 having aligned holes therethrough at their ends. A cam 23 in the shape of a pawl is pivotally mounted intermediate its ends on bracket 22 by means of a bar 24 passing through aligned holes in bracket 22 and cam 23 and secured by cotter pins 25. The lower ends of the pair of lever arms 8 have aligned holes through which a bar 26 passes, the latter retained in position by cotter pins 27. A roller 28 surrounding bar 26 rides along the inner surface of cam 23 thereby minimizing friction. Cover 6 is retained in normal closed position by tension exerted by spring 29 which is hooked to one end of cam 23 through eye 31 and held at the other end by eye-bolt 32 passing through flange 3. Adjustment of the degree of tension to be exerted by spring 29 may be made by turning nut 33.

An important feature in the present invention resides in the impediment resulting from the shoulder or recess 34 provided in cam 23 against which roller 28 rests when cover 6 is in normal closed position thus requiring a high initial pressure to overcome the additive effects of the tension on spring 29 and the resistance caused by lodging roller 28 in shoulder 34.

In order to further illustrate the present invention the operation of the explosion head will now be described in conjunction with a typical by-product coke oven fuel gas main. The tension to be exerted by spring 29 will be adjusted by means of nut 33 to approximately the same pressure existing in gas main 2 which normally is about 1 p. s. i. The depression of recess 34 in cam 23 will be sufficiently deep to require an additional 5-6 p. s. i. to overcome the resistance created thereby in order to cause roller 28 to move out of shoulder 34. Thus the total initial resistance which must be overcome in order to permit hinged cover 6 to open will be a total of 1 p. s. i. spring pressure plus 6 p. s. i. recess 34 resistance or a total of 7 p. s. i. Thus minor variations in gas pressure in main 2 will not cause opening of the explosion head. However should a sharp rise in pressure (above 7 p. s. i.) occur in gas main 2 due to an internal explosion or for some other reason, cover 6 will automatically open pulling lever arms 8 and attached roller 28 outwardly along the surface of cam 23 until roller 28 moves out of its locked position beyond recess 34 whereupon it rides along the relatively flat surface of cam 23 which offers no substantial resistance to the further outward movement of roller 28. Since the initial resistance due to pocket 34 has been overcome by roller 28 passing beyond that point, tension for closing cover 6 is imparted solely by spring 29. Consequently gases will continue to be relieved from main 2 until the pressure in the gas main drops to about 1 p. s. i., thereby relieving the system of excess gases up to the point where it reaches normal operating pressure at which time the tension of spring 29 is sufficient to pull cover 6 back in normal closed position and simultaneously roller 28 returns to recess 34, thus automatically locking and setting the pressure relief valve for an opening pressure of 7 p. s. i. Because the closing pressure of the valve is lower than the opening pressure cover 6 will remain open wide at reduced pressures thereby rapidly relieving the internal pressure in the gas main. Stop 30 at the end of cam 23 serves to prevent over-travel of cover 6 with consequent overloading or rupture of spring 29.

It will be understood the above described hinged cover, tension spring and recessed pawl structure represent one desirable arrangement and that other arrangements of covers, pressure closing means and added initial resistance means may be used. Further, it will be evident the application of this invention is not restricted to use on a by-product coke oven gas main but may be employed as a safety device on other conduits or containers containing fluids under pressure which are subject to pressure changes.

I claim:

1. An automatic pressure relief valve adapted to open under predetermined pressure and to remain open under pressure lower than said predetermined pressure comprising in combination a hinged cover, pressure means exerting a force on the cover constantly urging it in normal closed position, a member extending from the cover and movable therewith, a cam having a recess on its surface engaging said member, said member resting in the recess when the cover is in normal closed position thereby imparting added resistance to initial opening movement of the cover until overcome by the initial opening of the cover but without substantial resistance to the closing movement of the cover, and a stop on the cam limiting the extent to which the cover may open thereby preventing over-travel of the cover.

2. An explosion head comprising, in combination, a body of the head having one end adapted to be secured to an opening in a container maintained under pressure, a hinged cover closing the other end of the head, an arm extending from the cover and movable therewith engaging the surface of a pivotally mounted cam, a recess on the cam in which the arm rests when the cover is in normal closed position, pressure means attached to the cam thereby exerting force against the arm and urging the cover to closed position, and a stop on the cam to limit the extent to which the cover may open.

3. An explosion head comprising in combination a body having one end adapted to be secured to an opening in a by-product coke over gas main, a cover closing the other open end of the head, a hinge bracket fastened to the top of the head, a pair of spaced lever arms attached to the outer surface of the cover with the upper ends of the lever arms mounted on the hinge bracket and the opposite ends of the lower arms extending below the cover, a bar joining the bottom ends of the lever arms, a roller rotatably mounted on the bar, a second bracket fastened to the bottom of the head, a cam in the shape of a pawl pivotally mounted intermediate its ends on the second bracket with the inner surface of the cam engaging the roller, a recess on the cam in which the roller rests when the cover is in normal closed position, a tension spring attached to one end of the cam thereby exerting pressure against the roller for urging the cover in closed position, and the other end of the cam acting as a stop for the roller to limit the extent to which the cover may open.

4. An automatic pressure relief valve adapted to open under predetermined pressure and to remain open under pressure lower than said predetermined pressure comprising in combination, a closure movable to open and closed position, pressure means exerting a force on the closure constantly urging it in normal closed position, a member extending from the closure and movable therewith, a cam having a recess on its surface engaging said member, said member resting in the recess when the closure is in normal closed position thereby imparting added resistance to initial opening movement of the closure until overcome by the initial opening of the closure but without substantial resistance to the closing movement of the closure, and a stop on the cam limiting the extent to which the closure may open thereby preventing over-travel of the closure.

BENJAMIN A. FREEMAN.

References Cited in the file of this patent

UNITED STATES PATENTS

| Number | Name | Date |
|---|---|---|
| 452,882 | Giffard | May 26, 1891 |
| 802,945 | Waterman | Oct. 24, 1905 |
| 1,441,018 | Mecklinburg | Jan. 2, 1923 |
| 1,449,646 | Bathrick et al. | Mar. 27, 1923 |
| 2,213,181 | Von Wagenheim | Aug. 27, 1940 |
| 2,264,655 | Brockmann | Dec. 2, 1941 |
| 2,308,347 | Asselin | Jan. 12, 1943 |
| 2,505,413 | Lee | Apr. 25, 1950 |

FOREIGN PATENTS

| Number | Country | Date |
|---|---|---|
| 439,602 | Great Britain | of 1935 |